United States Patent
Zijlma et al.

(10) Patent No.: US 7,902,296 B2
(45) Date of Patent: Mar. 8, 2011

(54) POLY(ARYLENE ETHER) COMPOSITION AND ARTICLE

(75) Inventors: Geuch Zijlma, Goes (NL); Michael L. Todt, Rexford, NY (US)

(73) Assignee: Sabic Innovative Plastics IP B.V. (NL)

( * ) Notice: Subject to any disclaimer, the term of this patent is extended or adjusted under 35 U.S.C. 154(b) by 666 days.

(21) Appl. No.: 11/858,167

(22) Filed: Sep. 20, 2007

(65) Prior Publication Data

US 2009/0082520 A1 Mar. 26, 2009

(51) Int. Cl.
*C08L 53/00* (2006.01)
(52) U.S. Cl. .......................... 525/93; 524/505; 524/508
(58) Field of Classification Search .................. 524/505, 524/508; 525/93
See application file for complete search history.

(56) References Cited

U.S. PATENT DOCUMENTS

| | | | |
|---|---|---|---|
| 3,431,323 A | 3/1969 | Jones | |
| 4,940,753 A | 7/1990 | Okada et al. | |
| 5,100,959 A | 3/1992 | Okada et al. | |
| 5,307,958 A | 5/1994 | Burrows | |
| 5,385,168 A | 1/1995 | Lund | |
| 6,820,637 B1 | 11/2004 | Vertanen et al. | |
| 7,056,973 B2 * | 6/2006 | Patel | 524/508 |

FOREIGN PATENT DOCUMENTS

| | | |
|---|---|---|
| CA | 2563527 | 10/2005 |
| EP | 199510 | 10/1986 |
| EP | 1298258 | 4/2003 |

OTHER PUBLICATIONS

The International Searching Authority, International Search Report, PCT/US2008/075071, Mailing Date: Apr. 21, 2009, 4 pages.
The International Searching Authority, International Search Report, PCT/US2008/075071, Mailing Date: Apr. 21, 2009, 6 pages.
KR 10-2003-0047587 A, Publication Date: Jun. 18, 2003, Abstract, 1 page.
KR 10-1998-028081 A, Publication Date: Jul. 15, 1998, stn caplus wpindex KR1998-028081.doc, 3 pages.
KR 10-2002-0007813 A, Publication Date: Jan. 29, 1998, Abstract.
JP 2000-290450 A, Publication Date: Oct. 17, 2000, Abstract.
ISO 178, Plastics—Determination of flexural properties, 23 pages, Dec. 2001.
ISO 180, Plastics—Determination of Izod impact strength, 16 pages, Dec. 2000.
ISO 527, Plastics—Determination of tensile properties, Parts 1-5, 54 pages, Jun. 1993.
ISO 1167-1, Thermoplastics pipes, fittings and assemblies for the conveyance of fluids—Determination of the resistance of internal pressure Part 1: General method, 15 pages, Feb. 2008.
ISO 1167-2, Thermoplastics pipes, fittings and assemblies for the conveyance of fluids—Determination of the resistance of internal pressure Part 2: Preparation of pipe test pieces, 10 pages, Feb. 2006.
ASTM D1599-99, Standard Test Method for Resistance to Short-Time Hydraulic Pressure of Plastic Pipe, Tubing, and Fittings, 3 pages, 2005.

* cited by examiner

*Primary Examiner* — Peter D Mulcahy
(74) *Attorney, Agent, or Firm* — Cantor Colburn LLP

(57) ABSTRACT

A composition includes specific amounts of a high molecular weight poly(arylene ether), a rubber-modified polystyrene, and a hydrogenated block copolymer. The use of the high molecular weight poly(arylene ether) unexpectedly provides substantially improved durability to articles molded from the composition. The composition is particularly useful for molding hot water pipes and fittings.

14 Claims, No Drawings

POLY(ARYLENE ETHER) COMPOSITION AND ARTICLE

BACKGROUND OF THE INVENTION

Hot water pipes and fittings must be able to withstand prolonged exposure to high temperatures and pressures, as well as fluctuations in temperature and pressure. They must also resist failure when exposed to cycles of fluctuating loads or stresses associated with the pressure shocks resulting from opening and closing taps (the so-called "water hammer effect") and the temperature variations associated with flow of warm water into a cold fitting or cold water into a warm fitting. Historically, copper metal has been the material most commonly used for hot water pipes and fittings. Recently, certain plastics, such as polysulfones and polyethersulfones, have also been used for hot water pipes and fittings, but these plastic materials are quite expensive relative to other plastics. There is therefore a need for less expensive plastic materials that exhibit the range of properties required for use in hot water fittings and pipes.

BRIEF DESCRIPTION OF THE INVENTION

The above-described and other drawbacks are alleviated by a composition, comprising: 50 to 90 weight percent of a poly(arylene ether) having a weight average molecular weight of 85,000 to 120,000 atomic mass units; 10 to 30 weight percent of a rubber-modified polystyrene; and 2 to 10 weight percent of a hydrogenated block copolymer of an alkenyl aromatic monomer and a conjugated diene; wherein all weight percents are based on the total weight of the composition; and wherein the composition exhibits a tensile stress at yield of at least 65 megapascals measured at 23° C. according to ISO 527, a notched Izod impact strength of at least 15 kilojoules/meter$^2$ measured at 23° C. according to ISO 180/A1, a tensile fatigue resistance of at least 100,000 cycles measured at 23° C., 25 megapascals, and 5 Hertz, and a creep rupture resistance of at least 150 hours measured at a hoop stress of 18 megapascals according to ISO 1167.

Another embodiment is an article comprising a composition comprising: 50 to 90 weight percent of a poly(arylene ether) having a weight average molecular weight of 85,000 to 95,000 atomic mass units; 10 to 30 weight percent of a rubber-modified polystyrene; and 2 to 10 weight percent of a hydrogenated block copolymer of an alkenyl aromatic monomer and a conjugated diene; wherein all weight percents are based on the total weight of the composition; and wherein the composition exhibits a tensile stress at yield of at least 65 megapascals measured at 23° C. according to ISO 527, a notched Izod impact strength of at least 15 kilojoules/meter$^2$ measured at 23° C. according to ISO 180/A1, a tensile fatigue resistance of at least 100,000 cycles measured at 23° C., 25 megapascals, and 5 Hertz, and a creep rupture resistance of at least 150 hours measured at a hoop stress of 18 megapascals according to ISO 1167.

Another embodiment is a method of increasing the tensile fatigue resistance of a hot water fitting comprising a poly(arylene ether) composition, comprising: fabricating a hot water fitting from a poly(arylene ether) composition; and employing a poly(arylene ether) having a weight average molecular weight of 85,000 to 120,000 atomic mass units in the poly(arylene ether) composition; wherein the poly(arylene ether) composition comprises 50 to 90 weight percent of the poly(arylene ether), 10 to 30 weight percent of a rubber-modified polystyrene, and 2 to 10 weight percent of a hydrogenated block copolymer of an alkenyl aromatic monomer and a conjugated diene; wherein all weight percents are based on the total weight of the composition; and wherein the composition exhibits a tensile fatigue resistance of at least 100,000 cycles measured at 23° C., 25 megapascals, and 5 Hertz, a notched Izod impact strength of 15 to 21 kilojoules/meter$^2$ measured at 23° C. according to ISO 180/A1, a tensile stress at yield of at least 65 megapascals measured at 23° C. according to ISO 527, and a creep rupture resistance of at least 150 hours measured at a hoop stress of 18 megapascals according to ISO 1167

These and other embodiments are described in detail below.

DETAILED DESCRIPTION OF THE INVENTION

The present inventors have discovered that the tensile fatigue resistance of a blend of poly(arylene ether), rubber-modified polystyrene, and hydrogenated block copolymer can be substantially and unexpectedly improved by increasing the molecular weight of the poly(arylene ether). Creep rupture resistance and fluctuating pressure resistance are also unexpectedly improved. Thus, one embodiment is a composition, comprising: 50 to 90 weight percent of a poly(arylene ether) having a weight average molecular weight of 85,000 to 120,000 atomic mass units; 10 to 30 weight percent of a rubber-modified polystyrene; and 2 to 10 weight percent of a hydrogenated block copolymer of an alkenyl aromatic monomer and a conjugated diene; wherein all weight percents are based on the total weight of the composition; and wherein the composition exhibits a tensile stress at yield of at least 65 megapascals measured at 23° C. according to ISO 527, a notched Izod impact strength of at least 15 kilojoules/meter$^2$ measured at 23° C. according to ISO 180/A1, a tensile fatigue resistance of at least 100,000 cycles measured at 23° C., 25 megapascals, and 5 Hertz, and a creep rupture resistance of at least 150 hours measured at a hoop stress of 18 megapascals according to ISO 1167.

The composition exhibits a tensile stress at yield of at least 65 megapascals measured at 23° C. according to ISO 527. In some embodiments, the tensile stress at yield is 65 to 70 megapascals.

The composition also exhibits a tensile fatigue resistance of at least 100,000 cycles measured at 23° C., 25 megapascals, and 5 Hertz according to the procedure described in the working examples below. In some embodiments, the tensile fatigue resistance is 100,000 to 180,000 cycles, specifically 150,000 to 180,000 cycles.

The composition also exhibits a notched Izod impact strength of at least 15 kilojoules/meter$^2$, specifically 15 to 21 kilojoules/meter$^2$, measured at 23° C. according to ISO 180/A1.

The composition also exhibits a creep rupture resistance of at least 150 hours measured at a hoop stress of 18 megapascals according to ISO 1167. In some embodiments, the creep rupture resistance is 150 to 250 hours, specifically 200 to 250 hours.

The composition can also exhibit additional desirable properties. For example, in some embodiments the composition exhibits a flexural stress of at least 80 megapascals, specifically 80 to 110 megapascals, more specifically 90 to 110 megapascals, measured at 23° C. according to ISO 178. As another example, in some embodiments the composition exhibits a tensile knitline strength at yield of at least 50 megapascals, specifically 50 to 61 megapascals, more specifically 55 to 61 megapascals, measured on a double-gated tensile bar at 23° C. according to ISO 527.

The composition comprises a poly(arylene ether) having a weight average molecular weight of 85,000 to 120,000 atomic mass units, specifically 85,000 to 100,000 atomic mass units, more specifically 85,000 to 95,00 atomic mass units, even more specifically 88,000 to 92,000 atomic mass units. It will be understood that this weight average molecular weight range refers to the poly(arylene ether) in the final composition—that is, after compounding with other components. Those skilled in the processing of poly(arylene ether)s recognize that their molecular weight can increase significantly (e.g., 5 to 15 percent) under the melt kneading conditions used to form a thermoplastic blend. So, the weight average molecular weight of the poly(arylene ether) component can be less 85,000 atomic mass units before it is melt kneaded with the other components of the composition.

Suitable poly(arylene ether)s include those comprising repeating structural units having the formula

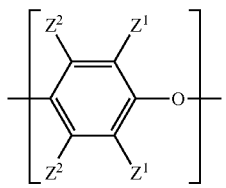

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether).

The poly(arylene ether) can comprise molecules having aminoallyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The composition comprises 50 to 90 weight percent of the poly(arylene ether), based on the total weight of the composition. Within this range, the poly(arylene ether) amount can be 60 to 80 weight percent, more specifically 66 to 74 weight percent.

In addition to the poly(arylene ether), the composition comprises a rubber-modified polystyrene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene, and 4 to 20 weight percent polybutadiene, specifically 6 to 12 weight percent polybutadiene. In some embodiments, the rubber-modified polystyrene has an effective gel content of 10 to 35 percent. Suitable rubber-modified polystyrenes are commercially available as, for example, GEH 1897 from GE Plastics (now SABIC Innovative Plastics), and D7022.27 from Chevron.

The composition comprises 10 to 30 weight percent of the rubber-modified polystyrene, based on the total weight of the composition. Within this range, the rubber-modified polystyrene amount can be 15 to 25 weight percent, more specifically 20 to 25 weight percent.

In addition to the poly(arylene ether) and the rubber-modified polystyrene, the composition comprises a hydrogenated block copolymer of an alkenyl aromatic monomer and a conjugated diene. In some embodiments, the hydrogenated block copolymer has a weight average molecular weight greater than or equal to 200,000 atomic mass units, specifically 200,000 to 450,000 atomic mass units, more specifically 250,000 to about 450,000 atomic mass units. Methods for making high molecular weight hydrogenated block copolymers are known in the art and described, for example, in U.S. Pat. No. 3,431,323 to Jones. High molecular weight hydrogenated block copolymers are also commercially available as, for example, the polystyrene-poly(ethylene/butylene)-polystyrene triblock copolymer having a styrene content of 31 weight percent based and a weight average molecular weight of about 240,000 to about 301,000 atomic mass units (AMU) available from Kraton Polymers as KRATON G 1651, and the polystyrene-poly(ethylene/butylene)-polystyrene triblock copolymer having a styrene content of 31 weight percent based and a weight average molecular weight of about 350,000 to about 450,000 atomic mass units (AMU) available from Kraton Polymers as KRATON MD6933ES.

The alkenyl aromatic monomer used to prepare the hydrogenated block copolymer can have the structure

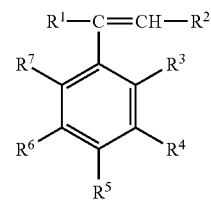

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$-$R^6$ each independently represent a hydrogen atom, a $C_1$-$C_8$ allyl group, or a $C_2$-$C_8$ alkenyl group; or $R^3$ and $R^4$ are taken together with the central aromatic ring to form a naphthyl group, or $R^4$ and $R^5$ are taken together with the central aromatic ring to form a naphthyl group. Specific alkenyl aromatic monomers include, for example, styrene, chlorostyrenes such as p-chlorostyrene, and methylstyrenes such as alpha-methylstyrene and p-methylstyrene. In some embodiments, the alkenyl aromatic monomer is styrene. In some embodiments, the poly(alkenyl aromatic) content of the hydrogenated block copolymer is 10 to 40 weight percent, specifically 10 to 35 weight percent, based on the total weight of the hydrogenated block copolymer. In other embodiments, the poly(alkenyl aromatic) content of the hydrogenated block copolymer is 40 to 75 weight percent, specifically 55 to 75 weight percent, based on the total weight of the hydrogenated block copolymer.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. Method of preparing tapered block copolymers, which may also be referred to as controlled distribution block copolymers, are described, for example, in U.S. Patent Application No. US 2003/181584 A1 of Handlin et al. In some embodiments, the hydrogenated block copolymer has a non-tapered linear structure. In some embodiments, the hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing six or more blocks in total of A and B, wherein the molecular weight of each A block may be the same as or different from that of other A blocks, and the molecular weight of each B block may be the same as or different from that of other B blocks. In some embodiments, the hydrogenated block copolymer is a diblock copolymer, a triblock copolymer, or a combination thereof.

Methods of preparing block copolymers are known in the art and many hydrogenated block copolymers are commercially available. Illustrative commercially available hydrogenated block copolymers include the polystyrene-poly(ethylene-propylene) diblock copolymers available from Kraton Polymers as Kraton G1701 and G1702; the polystyrene-poly(ethylene-butylene)-polystyrene triblock copolymers available from Kraton Polymers as Kraton G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as Kraton RP-6935 and RP-6936, the polystyrene-poly(ethylene-propylene)-polystyrene triblock copolymers available from Kraton Polymers as Kraton G1730; the maleic anhydride-grafted polystyrene-poly(ethylene-butylene)-polystyrene triblock copolymers available from Kraton Polymers as Kraton G1901, G1924, and MD-6684; the maleic anhydride-grafted polystyrene-poly(ethylene-butylene-styrene)-polystyrene triblock copolymer available from Kraton Polymers as Kraton MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-polybutadiene-poly(styrene-butadiene)-polybutadiene block copolymer available from Asahi Kasei Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising about 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 weight percent polystyrene available from Kuraray as SEPTON S2104. Mixtures of two of more block copolymers may be used.

In some embodiments, the hydrogenated block copolymer is a polystyrene-poly(ethylene-butylene)-polystyrene triblock copolymer. This block copolymer does not include the residue of any functionalizing agents or any monomers other than those indicated by their names.

In some embodiments, the hydrogenated block copolymer excludes the residue of monomers other than the alkenyl aromatic compound and the conjugated diene.

In some embodiments, the hydrogenated block copolymer excludes the residue of acid functionalizing agents, such as maleic anhydride. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

The composition comprises the hydrogenated block copolymer in an amount of 2 to 10 weight percent, specifically 3 to 8 weight percent, more specifically 3 to 7 weight percent, based on the total weight of the composition.

The composition can, in some embodiments, include components in addition to the required poly(arylene ether), rubber-modified polystyrene, and hydrogenated block copolymer. For example, in some embodiments the composition further comprises various additives known in the thermoplastics art, such as stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, and the like, and combinations thereof. When the composition is used to fabricate pipes or fitting that can contact drinking water, the composition should comply with materials standards in the respective country. For example, in Germany, this is KTW (Kunststoffe im Trinkwasser)-Empfehlungen as given by DVGW (Deutsche Vereinigung des Gasund Wasserfaches e.V.). For the United Kingdom, this is the WRAS (Water Regulations Advisory Scheme). In the United States there is the NSF-61 Drinking water system components approval by the National Sanitation Foundation.

In some embodiments, the composition excludes any polymer other than those taught herein as required or optional. For example, the composition can exclude polyolefins (except for less than or equal to 3 weight percent of polyolefins such as low density polyethylene or linear low density polyethylene used as a mold release agent), polyamides, polyesters, and the like.

In some embodiments, the composition excludes reinforcing fillers such as glass fibers, carbon fibers, talc, clays (including nanoclays), and the like. The exclusion of fillers does not preclude the use of less than 3 weight percent of pigments, such as carbon black and titanium dioxide.

In some embodiments, the composition consists of the poly(arylene ether); the rubber-modified polystyrene; the hydrogenated block copolymer; and optionally, less than or equal to 5 weight percent of an additive selected from the group consisting of stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, and the like, and combinations thereof.

In some embodiments, the composition comprises 66 to 74 weight percent of the poly(arylene ether); the poly(arylene ether) is a poly(2,6-dimethyl-1,4-phenylene ether) having a weight average molecular weight of 88,000 to 92,000 atomic mass units; the composition comprises 20 to 25 weight percent of the rubber-modified polystyrene; the rubber-modified polystyrene comprises 88 to 94 weight percent polystyrene and about 6 to about 12 weight percent polybutadiene; the composition comprises 3 to 7 weight percent of the hydrogenated block copolymer; the hydrogenated block copolymer is a polystyrene-poly(ethylene-butylene)-polystyrene triblock copolymer having a weight average molecular weight of 250,000 to 450,000 atomic mass units; and the composition exhibits a tensile stress at yield of 65 to 70 megapascals measured at 23° C. according to ISO 527, a tensile fatigue resistance of 100,000 to 180,000 cycles measured at 23° C., 25 megapascals, and 5 Hertz, a creep rupture resistance of 150 to 250 hours measured at a hoop stress of 18 megapascals according to ISO 1167, and a notched Izod impact strength of 15 to 21 kilojoules/meter$^2$ measured at 23° C. according to ISO 180/A1.

As noted above, the composition is particularly suitable for fabricating hot water pipes and fittings, as well as other articles that must exhibit dimensional stability and mechanical strength when exposed to hot water. Articles can be prepared from the composition using fabrication methods known in the art, including, for example, single layer and multilayer foam extrusion, single layer and multilayer sheet extrusion, injection molding, blow molding, extrusion, film extrusion, profile extrusion, pultrusion, compression molding, thermoforming, pressure forming, hydroforming, vacuum forming, foam molding, and the like. Combinations of the foregoing article fabrication methods can be used. Representative hot water fittings are described, for example, in U.S. Pat. Nos. 6,820,637 B1 to Vertanen et al., 5,385,168 to Lund, 5,307,958 to Burrows; and European Patent No. EP 1,298,258 B1 to Cristina; and International Patent Application No. WO 2005/100852 A1 of Buhlmann.

One embodiment is an article comprising a composition comprising: 50 to 90 weight percent of a poly(arylene ether) having a weight average molecular weight of 85,000 to 95,000 atomic mass units; 10 to 30 weight percent of a rubber-modified polystyrene; and 2 to 10 weight percent of a hydrogenated block copolymer of an alkenyl aromatic monomer and a conjugated diene; wherein all weight percents are based on the total weight of the composition; and wherein the composition exhibits a tensile stress at yield of at least 65 megapascals measured at 23° C. according to ISO 527, a tensile fatigue resistance of at least 100,000 cycles measured at 23° C., 25 megapascals, and 5 Hertz, and a creep rupture resistance of at least 150 hours measured at a hoop stress of 18 megapascals according to ISO 1167. In some embodiments, the composition comprises 66 to 74 weight percent of the poly(arylene ether); the poly(arylene ether) is a poly(2,6-dimethyl-1,4-phenylene ether) having a weight average molecular weight of 88,000 to 92,000 atomic mass units; the composition comprises 20 to 25 weight percent of the rubber-modified polystyrene; the rubber-modified polystyrene comprises 88 to 94 weight percent polystyrene and about 6 to about 12 weight percent polybutadiene; the composition comprises 3 to 7 weight percent of the hydrogenated block copolymer; the hydrogenated block copolymer is a polystyrene-poly(ethylene-butylene)-polystyrene triblock copolymer having a weight average molecular weight of 250,000 to 450,000 atomic mass units; and the composition exhibits a tensile stress at yield of 65 to 70 megapascals measured at 23° C. according to ISO 527, a tensile fatigue resistance of 100,000 to 180,000 cycles measured at 23° C., 25 megapascals, and 5 Hertz, a creep rupture resistance of 150 to 250 hours measured at a hoop stress of 18 megapascals according to ISO 1167, and a notched Izod impact strength of 15 to 21 kilojoules/meter$^2$ measured at 23° C. according to ISO 180/A1.

The invention is further illustrated by the following non-limiting examples.

Examples 1 and 2, Comparative Examples 1-6

These examples illustrate the property effects of poly(arylene ether) amount and molecular weight, hydrogenated block copolymer amount and molecular weight, and substitution of crystal clear polystyrene and high molecular weight polystyrene for rubber-modified polystyrene.

The components used to form the compositions are described in Table 1. Components amounts in each composition are summarized in Table 2, where component amounts are expressed in parts by weight.

TABLE 1

| Component Abbreviation | Description |
| --- | --- |
| PPE I | Poly(2,6-dimethyl-1,4-phenylene ether) (CAS Reg. No. 25134-01-4) having a number average molecular weight of about 90,000 atomic mass units and a weight average molecular weight of about 26,000 atomic mass units; obtained as PPO 805 from GE Plastics (now SABIC Innovative Plastics). |
| PPE II | Poly(2,6-dimethyl-1,4-phenylene ether) (CAS Reg. No. 25134-01-4) having a number average molecular weight of about 16,000 atomic mass units and a weight average molecular weight of about 55,000 atomic mass units; obtained as PPO 800 from GE Plastics (now SABIC Innovative Plastics). |
| SEBS I | A polystyrene-poly(ethylene-butylene)-polystyrene triblock copolymer having a polystyrene content of about 31 to 35 weight percent and a weight average molecular weight of about 240,000 to 300,000 atomic mass units; obtained as Kraton G1651 from Kraton Polymers or Calprene 6170 from Dynasol. |
| SEBS II | A polystyrene-poly(ethylene-butylene)-polystyrene triblock copolymer obtained as Kraton MD6933ES from Kraton Polymers. |

TABLE 1-continued

| Component Abbreviation | Description |
|---|---|
| LLDPE | Linear low-density polyethylene, CAS Reg. No. 25087-34-7; obtained as ESCORENE LL5100.09 from ExxonMobil. |
| LDPE | Low-density polyethylene, CAS Reg. No. 9002-88-4; obtained as STAMYLAN LD 1922 T from SABIC. |
| ZnS | Zinc sulfide (CAS Reg. No. 1314-98-3); obtained as Sachtolith HD ZNS from Sachtleben. |
| ZnO | Zinc oxide (CAS Reg. No. 1314-13-2); obtained as Zinc Oxide CR4 from GH Chemical |
| Phosphite stabilizer | Tris(2,4-di-tert-butylphenyl)phosphite; obtained as IRGAFOS 168 from Ciba Specialty Chemicals |
| $TiO_2$ | Titanium dioxide (CAS Reg. No. 13463-67-7); obtained as Kronos 2450 from Kronos BV. |
| CB | Carbon black (CAS Reg. No. 1333-86-4); obtained as Channel Black from Heritage |
| HIPS | Rubber-modified polystyrene; obtained as EMPERA 641F from Nova Chemical or HIPS 1897 from GE Plastics (now SABIC Innovative Plastics) |
| ccPS | Crystal Clear polystyrene; obtained as 686E from Dow Chemical. |
| HMWPS | A general purpose polystyrene having a weight average molecular weight of about 625,000 atomic mass units; obtained as Blendex 865 from Chemtura. |

Compositions were compounded on a Werner & Pfleiderer ZSK-28 28-millimeter inner diameter twin-screw extruder. The extruder barrel temperatures from feed throat to die were 210, 260, 280, 280, 280, 280, 280, 290, 300, 300 and 290° C. The screw speed was about 300 rotations per minute (rpm), and the throughput was 10-15 kilograms per hour. Prior to compounding, all components were dry blended and added to the feed throat of the extruder.

Physical testing was conducted on parts injection molded using a barrel temperature of 295° C. and a mold temperature of 100° C. Tensile stress at yield values, expressed in megapascals (MPa), were measured at 23° C. and a speed of 50 millimeters per minute according to ISO 527. Flexural stress values, expressed in megapascals, were measured at 23° C. according to ISO 178. Tensile knitline strength values, expressed in units of megapascals, were measured at 23° C. on double-gated tensile bars according to ISO 527-2. Notched Izod impact strength values, expressed in kilojoules/meter$^2$ (kJ/m$^2$), were measured at 23° C. according to ISO 180/A1. Melt Volume Rate (MVR) values, expressed in cubic centimeters per 10 minutes, were measured according to ISO 1133 at 280 or 300° C. and a 10 kilogram load. Tensile fatigue values, expressed in the number of cycles to failure, were measured at 23° C., 25 megapascals load, and 5 Hertz; specifically, a standard ISO tensile bar is clamped in a universal testing machine (such as MTS 858 or Instron 8874) and is subjected to a cyclically varying load of 25 MPa at a frequency of 5 Hertz; the test ends when the tensile bar fails, the number of cycles to failure is reported. The Top Gated Pressure Vessel burst pressure values, expressed in Bar, were measured at 23° C. according to ASTM D1599. The Top Gated Pressure Vessels have an outer diameter of 46.7 millimeters and wall thickness of 2.45 millimeters. The Top Gated Pressure Vessels can be molded with and without a weld line over the length of the tube. All testing done in this work was with a weld line.

Long-term hydraulic pressure stability values (creep rupture resistance values), expressed in hours, were measured at a stress of 16 or 18 or 20 megapascals, according to ISO 1167-1:2006. With the fitting geometry employed, the stress of 20 kilopascals produces a hoop stress of 18 megapascals. The tests used 90° C. water inside and outside the test part. Failure is defined by a pressure loss inside the part as a result of cracks or breakage. The testing was performed on Top Gated Pressure Vessels with a weld line as result of an obstacle in the part. The Top Gated Pressure Vessels have an outer diameter of 46.7 mm and wall thickness of 2.45 mm. The Top Gated Pressure Vessels can be molded with and without a weld line over the length of the tube. All testing done in this work was with a weld line. The Top Gated Pressure Vessels used a Type A cap according to ISO 1167-1, FIG. 1.

Fluctuating pressure stability values, expressed in hours, were measured at applied stress of 1.8 to 7.2 megapascals, 0.2 Hz, 90° C. water inside, air outside.

Compositions and property values are summarized in Table 2. Among the eight compositions tested, only the Example 1 and 2 compositions satisfy the property requirements for hot water fitting. These compositions satisfy the compositional limitations of 50 to 90 weight percent of a poly(arylene ether) having a post-compounding weight average molecular weight of 85,000 to 95,000 atomic mass units, 10 to 30 weight percent of a rubber-modified polystyrene, and 2 to 10 weight percent of hydrogenated block copolymer. Comparative Example 1, which contains less poly(arylene ether), lower molecular weight poly(arylene ether) more rubber-modified polystyrene, and less hydrogenated block copolymer than the inventive compositions, is deficient in its tensile stress at yield and tensile fatigue resistance, and it is grossly deficient in creep rupture resistance. Comparative Example 2, which contains lower molecular weight poly(arylene ether) and less hydrogenated block copolymer than the inventive compositions, is deficient in tensile fatigue resistance (creep rupture resistance was not tested). Comparative Example 3, which contains lower molecular weight poly(arylene ether) that the inventive compositions, is deficient in tensile fatigue resistance and creep rupture resistance. Comparative Example 4, which contains more hydrogenated block copolymer than the inventive compositions, is deficient in tensile stress at yield and tensile fatigue resistance, and grossly deficient in creep rupture resistance. Comparative Example 5, which substitutes a crystal clear polystyrene for the rubber-modified polystyrene of the inventive compositions, is deficient in creep rupture resistance (tensile fatigue resistance was not measured). Comparative Example 6, which substitutes a high molecular weight polystyrene for the rubber-modified polystyrene of the inventive compositions, is deficient in tensile fatigue resistance. Only inventive Examples 1 and 2 exhibit the tensile stress at yield, tensile fatigue resistance, and creep rupture resistance required for use in hot water fittings. It was unexpected that increasing the molecular weight of the poly(arylene ether) would provide a substantial increase in tensile fatigue resistance, as well as significant improvements in creep rupture resistance and fluctuating pressure resistance (see Example 1 versus Comparative Example 3).

TABLE 2

| | C. Ex. 1 | C. Ex. 2 | C. Ex. 3 | C. Ex. 4 |
|---|---|---|---|---|
| COMPOSITIONS | | | | |
| PPE I | 0 | 0 | 0 | 0 |
| PPE II | 40.5 | 70.5 | 70.5 | 70.5 |
| SEBS I | 0 | 0 | 5.0 | 15.0 |
| SEBS II | 0 | 0 | 0 | 0 |
| LLDPE | 0 | 0 | 1.5 | 1.5 |
| LDPE | 1.5 | 1.5 | 0 | 0 |
| ZnS | 0.1 | 0.1 | 0.1 | 0.1 |

TABLE 2-continued

|  |  |  |  |  |
|---|---|---|---|---|
| ZnO | 0.1 | 0.1 | 0.1 | 0.1 |
| Phosphite stabilizer | 0.1 | 0.1 | 0.1 | 0.1 |
| TiO$_2$ | 0 | 0 | 0 | 0 |
| CB | 1.0 | 1.0 | 1.0 | 1.0 |
| HIPS | 57.7 | 27.7 | 22.7 | 12.7 |
| ccPS | 0 | 0 | 0 | 0 |
| HMWPS | 0 | 0 | 0 | 0 |
| PROPERTIES |  |  |  |  |
| Tensile stress at yield (MPa) | 51.1 | 71.8 | 68.6 | 58.7 |
| Flexural stress (MPa) | 77 | 100 | 95 | 78 |
| Tensile knitline strength at yield (MPa) | — | — | 55.9 | 51.6 |
| Notched Izod impact strength (kJ/m$^2$) | 14.4 | 13.7 | 20.6 | 36.4 |
| MFR at 300° C., 10 kg (mL/10 min) | — | — | 16.2 | 10.0 |
| MFR at 280° C., 10 kg (mL/10 min) | 28.5 | 6.5 | — | — |
| Tensile fatigue, 25 MPa (cycles) | 40223 | 41183 | 72949 | 59090 |
| Dead end tube burst pressure (Bar) | 61 | — | 72 | 58 |
| Long term hydraulic pressure stability at 16 kilopascals (hours) | 101 | — | 303 | 10 |
| Long term hydraulic pressure stability at 18 kilopascals (hours) | 6 | — | 130 | 3 |
| Long term hydraulic pressure stability at 20 kilopascals (hours) | 1 | — | 114 | 4 |
| Fluctuating pressure stab. (hours) | 168 | — | 662 | 113 |

|  | Ex. 1 | C. Ex. 5 | C. Ex. 6 | Ex. 2 |
|---|---|---|---|---|
| COMPOSITIONS |  |  |  |  |
| PPE I | 70.5 | 71.0 | 71.0 | 71.0 |
| PPE II | 0 | 0 | 0 | 0 |
| SEBS I | 5.0 | 5.0 | 5.0 | 0 |
| SEBS II | 0 | 0 | 0 | 5.0 |
| LLDPE | 1.5 | 1.0 | 1.0 | 1.0 |
| LDPE | 0 | 0 | 0 | 0 |
| ZnS | 0.1 | 0.1 | 0.1 | 0.1 |
| ZnO | 0.1 | 0.1 | 0.1 | 0.1 |
| Phosphite stabilizer | 0.1 | 0.1 | 0.1 | 0.1 |
| TiO$_2$ | 0 | 1.0 | 1.0 | 1.0 |
| CB | 1.0 | 0 | 0 | 0 |
| HIPS | 22.7 | 0 | 0 | 22.7 |
| ccPS | 0 | 22.7 | 0 | 0 |
| HMWPS | 0 | 0 | 22.7 | 0 |
| PROPERTIES |  |  |  |  |
| Tensile stress at yield (MPa) | 69.4 | 70.8 | 70.8 | 69.7 |
| Flexural stress (MPa) | 96 | 107 | 110 | 104 |
| Tensile knitline strength at yield (MPa) | 54.6 | 66.9 | 35.1 | 60.1 |
| Notched Izod impact strength (kJ/m$^2$) | 20.1 | 5.5 | 5.2 | 19.8 |
| MFR at 300° C., 10 kg (mL/10 min) | 8.8 | 11.7 | 7.4 | 9.7 |
| MFR at 280° C., 10 kg (mL/10 min) | — | — | — | — |
| Tensile fatigue, 25 MPa (cycles) | 178704 | — | 59402 | 685514 |
| Dead end tube burst pressure (Bar) | 72.9 | 78.0 | 62.0 | — |
| Long term hydraulic pressure stability at 16 kilopascals (hours) | 434 | 222 | 261 | — |
| Long term hydraulic pressure stability at 18 kilopascals (hours) | 344 | 37 | 108 | — |
| Long term hydraulic pressure stability at 20 kilopascals (hours) | 343 | 81 | 169 | — |
| Fluctuating pressure stab. (hours) | 719 | 320 | 413 | — |

Examples 3-5, Comparative Examples 7 and 8

These examples illustrate the property effects of poly(arylene ether) amount and molecular weight, and hydrogenated block copolymer amount. Compositions are detailed in Table 3, where Example 1 and Comparative Examples 5 and 6 are repeated from Table 2. The results show that Examples 3-5, which are inventive compositions, satisfy the tensile stress at yield, tensile fatigue resistance, and creep rupture resistance requirements for use in hot water fittings. Comparative Example 7, which contains more poly(arylene ether) and less rubber-modified polystyrene than the inventive compositions, exhibits very poor impact strength. Comparative Example 8, which uses a blend of medium and high molecular weight poly(arylene ether)s, is deficient in tensile fatigue resistance. This further illustrates the unexpected criticality of poly(arylene ether) molecular weight in improving the tensile fatigue resistance of the composition.

TABLE 3

|  | Ex. 1 | C. Ex. 5 | C. Ex. 6 | Ex. 3 |
|---|---|---|---|---|
| COMPOSITIONS |  |  |  |  |
| PPE I | 70.5 | 71.0 | 71.0 | 79.4 |
| PPE II | 0 | 0 | 0 | 0 |
| SEBS I | 5.0 | 5.0 | 5.0 | 10.0 |
| LLDPE | 1.5 | 1.0 | 1.0 | 1.5 |
| ZnS | 0.1 | 0.1 | 0.1 | 0.1 |
| ZnO | 0.1 | 0.1 | 0.1 | 0.1 |
| Phosphite stabilizer | 0.1 | 0.1 | 0.1 | 0.1 |
| TiO$_2$ | 0 | 1.0 | 1.0 | 0 |
| CB | 1.0 | 0 | 0 | 1.0 |
| HIPS | 22.7 | 0 | 0 | 8.0 |
| ccPS | 0 | 22.7 | 0 | 0 |
| HMWPS | 0 | 0 | 22.7 | 0 |
| PROPERTIES |  |  |  |  |
| Tensile stress at yield (MPa) | 69.4 | 70.8 | 70.8 | 67.5 |
| Flexural stress (MPa) | 96 | 107 | 110 | 91 |
| Tensile knitline strength at yield (MPa) | 54.6 | 66.9 | 35.1 | 54.7 |
| Notched Izod impact strength (kJ/m$^2$) | 20.1 | 5.5 | 5.2 | 24.8 |
| MFR at 300° C., 10 kg (mL/10 min) | 8.8 | 11.7 | 7.4 | 4.1 |
| MFR at 280° C., 10 kg (mL/10 min) | — | — | — | — |
| Tensile fatigue, 25 MPa (cycles) | 178704 | — | 59402 | — |

|  | C. Ex. 7 | C. Ex. 8 | Ex. 4 | Ex. 5 |
|---|---|---|---|---|
| COMPOSITIONS |  |  |  |  |
| PPE I | 93.2 | 39.7 | 71.0 | 71.0 |
| PPE II | 0 | 39.7 | 0 | 0 |
| SEBS I | 5.0 | 10.0 | 7.0 | 3.0 |
| LLDPE | 1.5 | 1.5 | 1.0 | 1.0 |
| ZnS | 0.1 | 0.1 | 0.1 | 0.1 |
| ZnO | 0.1 | 0.1 | 0.1 | 0.1 |
| Phosphite stabilizer | 0.1 | 0.1 | 0.1 | 0.1 |
| TiO$_2$ | 0 | 0 | 0 | 0 |
| CB | 1.0 | 1.0 | 1.0 | 1.0 |
| HIPS | 0 | 8.9 | 20.7 | 24.7 |
| ccPS | 0 | 0 | 0 | 0 |
| HMWPS | 0 | 0 | 0 | 0 |
| PROPERTIES |  |  |  |  |
| Tensile stress at yield (MPa) | 69.7 | 67.3 | 67.8 | 72.2 |
| Flexural stress (MPa) | 96 | 92 | 101 | 108 |
| Tensile knitline strength at yield (MPa) | 57.1 | 55.6 | 59.2 | 59.4 |
| Notched Izod impact strength (kJ/m$^2$) | 9.6 | 25.2 | 23.3 | 17.5 |

TABLE 3-continued

| | | | | |
|---|---|---|---|---|
| MFR at 300° C., 10 kg (mL/10 min) | 1.7 | 5.0 | 8.5 | 11.3 |
| MFR at 280° C., 10 kg (mL/10 min) | — | — | — | — |
| Tensile fatigue, 25 MPa (cycles) | 107528 | 77589 | 228543 | 411411 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A composition, comprising:
    50 to 90 weight percent of a poly(arylene ether); wherein the poly(arylene ether) consists of poly(arylene ether) having a weight average molecular weight of 85,000 to 120,000 atomic mass units;
    10 to 30 weight percent of a rubber-modified polystyrene comprising 80 to 96 weight percent polystyrene and 4 to 20 weight percent polybutadiene; and
    2 to 10 weight percent of a hydrogenated block copolymer of an alkenyl aromatic monomer and a conjugated diene, wherein the hydrogenated block copolymer has a poly(alkenyl aromatic) content of 10 to 40 weight percent;
    wherein all weight percents are based on the total weight of the composition; and
    wherein an article molded from the composition exhibits
        a tensile stress at yield of at least 65 megapascals measured at 23° C. according to ISO 527,
        a notched Izod impact strength of at least 15 kilojoules/meter$^2$ measured at 23° C. according to ISO 180/A1,
        a tensile fatigue resistance of at least 100,000 cycles measured at 23° C., 25 megapascals, and 5 Hertz, and
        a creep rupture resistance of at least 150 hours measured at a hoop stress of 18 megapascals according to ISO 1167.

2. The composition of claim 1, wherein an article molded from the composition exhibits
    a tensile stress at yield of 65 to 70 megapascals measured at 23° C. according to ISO 527,
    a notched Izod impact strength of 15 to 24 kilojoules/meter$^2$ measured at 23° C. according to ISO 180/A1,
    a tensile fatigue resistance of 100,000 to 180,000 cycles measured at 23° C., 25 megapascals, and 5 Hertz, and
    a creep rupture resistance of 150 to 250 hours measured at a hoop stress of 18 megapascals according to ISO 1167.

3. The composition of claim 1, wherein an article molded from the composition exhibits a flexural stress of at least 80 to 110 megapascals measured at 23° C. according to ISO 178.

4. The composition of claim 3, wherein the flexural stress is 80 to 110 megapascals measured at 23° C. according to ISO 178.

5. The composition of claim 1, wherein an article molded from the composition exhibits a tensile knitline strength at yield of 50 to 61 megapascals measured on a double-gated tensile bar at 23° C. according to ISO 527.

6. The composition of claim 1, wherein the rubber-modified polystyrene comprises 88 to 94 weight percent polystyrene and about 6 to about 12 weight percent polybutadiene.

7. The composition of claim 1, wherein the hydrogenated block copolymer is a polystyrene-poly(ethylene-butylene)-polystyrene triblock copolymer having a weight average molecular weight of 250,000 to 450,000 atomic mass units.

8. The composition of claim 1,
    wherein the composition comprises 66 to 74 weight percent of the poly(arylene ether);
    wherein the poly(arylene ether) consists of poly(2,6-dimethyl-1,4-phenylene ether) having a weight average molecular weight of 88,000 to 92,000 atomic mass units;
    wherein the composition comprises 20 to 25 weight percent of the rubber-modified polystyrene;
    wherein the rubber-modified polystyrene comprises 88 to 94 weight percent polystyrene and about 6 to about 12 weight percent polybutadiene;
    wherein the composition comprises 3 to 7 weight percent of the hydrogenated block copolymer;
    wherein the hydrogenated block copolymer is a polystyrene-poly(ethylene-butylene)-polystyrene triblock copolymer having a weight average molecular weight of 250,000 to 450,000 atomic mass units; and
    wherein an article molded from the composition exhibits
        a tensile stress at yield of 65 to 70 megapascals measured at 23° C. according to ISO 527,
        a notched Izod impact strength of 15 to 21 kilojoules/meter$^2$ measured at 23° C. according to ISO 180/A1,
        a tensile fatigue resistance of 100,000 to 180,000 cycles measured at 23° C., 25 megapascals, and 5 Hertz, and
        a creep rupture resistance of 150 to 250 hours measured at a hoop stress of 18 megapascals according to ISO 1167.

9. The composition of claim 8, wherein the composition consists of
    the poly(arylene ether);
    the rubber-modified polystyrene;
    the hydrogenated block copolymer; and
    optionally, less than or equal to 5 weight percent of an additive selected from the group consisting of stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, and the like, and combinations thereof.

10. An article comprising a composition comprising:

50 to 90 weight percent of a poly(arylene ether) consisting of poly(arylene ether) having a weight average molecular weight of 85,000 to 95,000 atomic mass units;

10 to 30 weight percent of a rubber-modified polystyrene comprising 80 to 96 weight percent polystyrene and 4 to 20 weight percent polybutadiene; and 2 to 10 weight percent of a hydrogenated block copolymer of an alkenyl aromatic monomer and a conjugated diene, wherein the hydrogenated block copolymer has a poly(alkenyl aromatic) content of 10 to 40 weight percent;

wherein all weight percents are based on the total weight of the composition; and wherein an article molded from the composition exhibits
a tensile stress at yield of at least 65 megapascals measured at 23° C. according to ISO 527,
a notched Izod impact strength of at least 15 kilojoules/meter$^2$ measured at 23° C. according to ISO 180/A1,
a tensile fatigue resistance of at least 100,000 cycles measured at 23° C., 25 megapascals, and 5 Hertz, and
a rupture resistance of at least 150 hours measured at a hoop stress of 18 megapascals according to ISO 1167.

11. The article of claim 10, wherein the article is a hot water fitting.

12. The article of claim 10,
wherein the composition comprises 66 to 74 weight percent of the poly(arylene ether);
wherein the poly(arylene ether) consists of poly(2,6-dimethyl-1,4-phenylene ether) having a weight average molecular weight of 88,000 to 92,000 atomic mass units;
wherein the composition comprises 20 to 25 weight percent of the rubber-modified polystyrene;
wherein the rubber-modified polystyrene comprises 88 to 94 weight percent polystyrene and about 6 to about 12 weight percent polybutadiene;
wherein the composition comprises 3 to 7 weight percent of the hydrogenated block copolymer;
wherein the hydrogenated block copolymer is a polystyrene-poly(ethylene-butylene)-polystyrene triblock copolymer having a weight average molecular weight of 250,000 to 450,000 atomic mass units; and
wherein an article molded from the composition exhibits
a tensile stress at yield of 65 to 70 megapascals measured at 23° C. according to ISO 527,
a notched Izod impact strength of 15 to 21 kilojoules/meter$^2$ measured at 23° C. according to ISO 180/A1,
a tensile fatigue resistance of 100,000 to 180,000 cycles measured at 23° C., 25 megapascals, and 5 Hertz, and
a creep rupture resistance of 150 to 250 hours measured at a hoop stress of 18 megapascals according to ISO 1167.

13. The article of claim 12, wherein the article is a hot water fitting.

14. A method of increasing the tensile fatigue resistance of a hot water fitting comprising a poly(arylene ether) composition, comprising:
fabricating a hot water fitting from a poly(arylene ether) composition; and
employing a poly(arylene ether) consisting of poly(arylene ether) having a weight average molecular weight of 85,000 to 120,000 atomic mass units in the poly(arylene ether) composition;
wherein the poly(arylene ether) composition comprises
50 to 90 weight percent of the poly(arylene ether),
10 to 30 weight percent of a rubber-modified polystyrene comprising 80 to 96 weight percent polystyrene and 4 to 20 weight percent polybutadiene, and
2 to 10 weight percent of a hydrogenated block copolymer of an alkenyl aromatic monomer and a conjugated diene, wherein the hydrogenated block copolymer has a poly(alkenyl aromatic) content of 10 to 40 weight percent;
wherein all weight percents are based on the total weight of the composition; and
wherein an article molded from the composition exhibits
a tensile fatigue resistance of at least 100,000 cycles measured at 23° C., 25 megapascals, and 5 Hertz,
a notched Izod impact strength of 15 to 21 kilojoules/meter$^2$ measured at 23° C. according to ISO 180/A1,
a tensile stress at yield of at least 65 megapascals measured at 23° C. according to ISO 527, and
a creep rupture resistance of at least 150 hours measured at a hoop stress of 18 megapascals according to ISO 1167.

\* \* \* \* \*